July 14, 1964     T. J. SULLIVAN     3,140,721
PRESSURE AND TEMPERATURE PROTECTOR FOR
AUTOMATIC FULL FLOW SHUT-OFF VALVE
Filed Jan. 8, 1962

INVENTOR.
Timothy J. Sullivan,
BY Pierce, Scheffler & Parker
his ATTORNEYS.

United States Patent Office 3,140,721
Patented July 14, 1964

3,140,721
PRESSURE AND TEMPERATURE PROTECTOR FOR AUTOMATIC FULL FLOW SHUT-OFF VALVE
Timothy J. Sullivan, 2280 Cross Drive, Butte, Mont.
Filed Jan. 8, 1962, Ser. No. 164,666
4 Claims. (Cl. 137—73)

This invention relates generally to a triggering device, responsive to excessive temperature and pressure conditions in a pressure vessel, operating a cut-off valve or other electrical or mechanical control.

Many commercial, industrial and domestic installations require the provision of a cut-off valve, electric switch, three-, or four-way pilot-operated valve or other means controlling the supply of energy to pressure vessels, such as boilers, furnaces, ovens, refineries and the like, to be automatically operated when either the temperature of or the pressure within certain equipment in the installation exceeds a predetermined safe value. The present invention relates to a temperature and pressure responsive triggering means for operating such valves, switch or other energy supply cut-off means.

The primary object of my invention is to provide a cut-off means which will automatically shut-off the supply of energy to a piece of equipment when either the temperature or the pressure therein exceeds certain predetermined safe limits.

A more specific object is to provide a valve having a movable head normally biased toward closed position on its seat, and held off its seat by a trigger operable to release the head in response to an excessive pressure or temperature in a pressure vessel, such as a boiler, to which vessel the heat supply is controlled by said valve.

A further object is to provide a fusible link in the temperature and pressure responsive portion of the automatic trigger release means, the fusible link being in direct conductive relation with the inside of the boiler (or other vessel) which is to be protected against excessive internal temperatures or/and pressures.

Other and more specific objects will appear in the following detailed description of a novel construction of shut-off valve and trigger control therefor operated by a temperature and pressure responsive device made in accordance with the present invention, as illustrated in the accompanying drawing, wherein.

Figure 1:
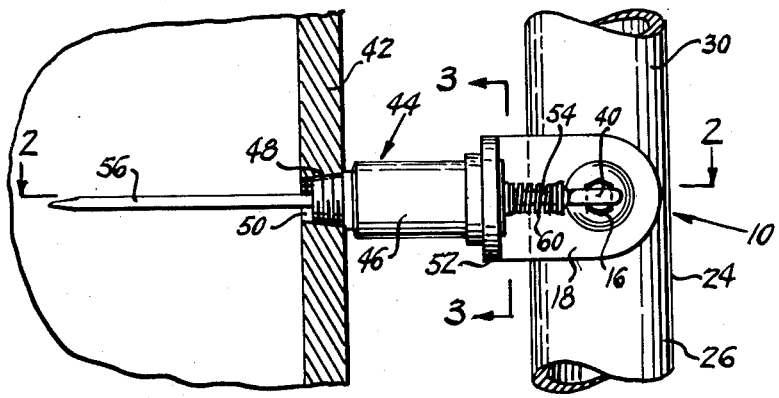
FIG. 1 is an elevational view of the novel control and valve mounted in the wall of a vessel to be protected.
Figure 3:
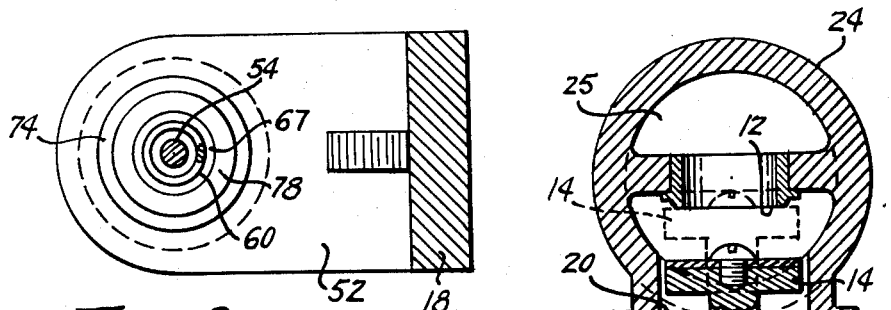
FIG. 3 is an enlarged sectional view taken on the line 3—3 of FIG. 1.
Figure 2:
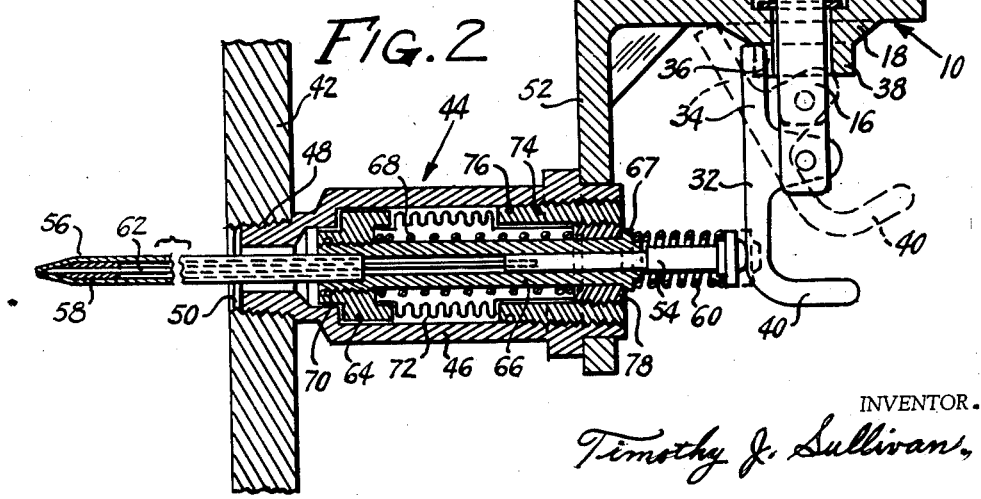
FIG. 2 is a horizontal sectional view taken on the line 2—2 of FIG. 1.

The dotted line position of the valve shown in FIG. 2 indicates the shut-off valve in normally closed position, as it would be after the trigger is operated to release the valve from its cocked-open position in which it is held during normal operation of the boiler within safe limits of temperature and pressure.

Although the invention as illustrated is applied to a shut-off valve, it could be used in connection with an electrical cut-off switch or any other triggered element, normally biased in one position and held against said bias in another position by the trigger means in the same manner as this shut-off valve.

Valve 10 is a typical fluid control valve having a valve seat 12 and a head 14 over said seat with a stem 16 slidably mounted in wall 18 of valve chamber 20.

The valve head 14 is biased by spring 22 toward said seat 12 to normally closed position with the head 14 pressed over the seat opening, so as to shut off the flow of fluid in conduit 24, the valve chamber 20 being connected to one end 26 of conduit 24 and a chamber 28 on the other side of the seat 12 being connected to the other end of said conduit.

A cocking lever or trigger 32 is pivotally mounted on the upper end of the stem 16 of the valve. The trigger conveniently may be shaped as shown, with one end 34 thereof movable into a notch 36 on the outside of the wall 18 in a flange 38 surrounding the stem 16 when the valve head is raised off its seat by pulling on a finger hook end 40 of the trigger until the lower end 34 thereof is moved into the notch 36.

A pressure and temperature sensing unit 44 is mounted in the wall 42 of a vessel, which vessel might be a boiler heated by a fuel burner to which latter a fluid fuel is supplied through the valve 10. Normally the fuel burner might be automatically controlled by a control valve to maintain a required boiler pressure. However, should the normal control fail, or should the water supply accidentally be stopped and hence fail to provide the steam to build up the pressure, the present sensing unit would operate to trip the trigger in response to the excessive pressure built up in the boiler due to the failure of the normal control or in response to the excessive temperature built up due to the lack of water in the boiler, and the shut-off valve would cut off the supply of fuel, thus saving the boiler from harm due to either excessive pressure or excessive heat or both.

The pressure and temperature sensing unit 44 may be mounted in the wall 42 by means of a thread on its casing threaded into a tapped and threaded bore 50 in the wall. A bracket 52, attached to the outer end of casing 46, has a portion 18 forming the outer wall of the valve chamber 40.

A rod 54 extends from the unit 44 to the proximity of the trigger in its cocked position, but normally does not operate the trigger arm 32 to release the valve 10 to its normally closed position, in response to the action of the spring 22, biased in the direction of the valve seat 12. The inner end of rod 62 which is fixed to the rod 54 is normally fixed to the tip of the probe 56 by a mass of fusible material 58. This material melts, when the temperature in the boiler exceeds a predetermined safe limit, releasing rod 62 and the spring 60 actuates the rod 54 against the trigger lever 32 immediately to release the valve 10 and shut off the supply of fuel through the conduit 24.

In the event the pressure in the boiler rises to a dangerous value it reacts on the inside of the piston assembly—which comprises the stepped sleeve or piston 64, the inner end of the relatively adjustable sleeve 66 and the probe 56 which is fixed to sleeve 66—so as to move this assembly against the pressure of spring 68 and thus to trip the trigger thereby releasing valve 10. Sleeve 66 may be provided with a hexagonal or square head 67 for adjustment of the pre-stress on the spring 68, in order to vary the pressure required to trip the trigger whenever it is necessary to adjust for a different safe pressure limit. A seal ring 70 maintains a pressure seal between the sleeve 66 and the stepped sleeve 64, while permitting threaded adjustment therebetween. Sylphon tube 72 is fixed at one end to the stepped piston sleeve 64 and at the other end to a sleeve 74, which is threadably adjustable in the outer end of casing 46. A seal ring 76 maintains a pressure seal between adjustable sleeve 74 and the casing 46.

Inner sleeve 78 is adjustably threaded to sleeve 74 and provides a stop for the head 67 at its outer end and a stop for the outer end of the spring 68 at its inner end. Sleeve 78 is threadably adjustable to vary the clearance between the head of rod 54 and the trigger lever, and the adjustment of sleeve 66 in sleeve 64 moves the piston assembly to vary the spring pressure for response to different safe pressure requirements.

The full line position of the head of rod 54, as shown in FIG. 2, is right up against the trigger lever 32 without tripping it; and the dotted line position (FIG. 2) of this head indicates its movement required to trip the lever 32 so that its end 34 slides out of the notch 36 and the valve is released to closed position in accordance with the bias of valve spring 22.

It will be noted that the mass of fusible material 58 is in direct contact with the probe 56—which is made of a high heat-conductive material—inside the vessel being protected, preventing any lag or delay in sensing a dangerous temperature just as soon as it reaches the danger point. In prior art devices, the fusible link in the shut-off means was inside a tubular casing, surrounded by air which acted as an insulator to delay the transmission of heat from the inside of the vessel to the fusible material. Thus, if the rise in the temperature in the vessel was at a sufficiently high rate of increase, the fusible material would not fuse soon enough to save the vessel from harmful overheating.

In prior art devices, the sylphon pressure element was placed inside the vessel where it was exposed to quick deterioration through oxidation. It will be noted that in the present device the sylphon element is outside of the vessel and located in a chamber of comparatively stagnant fluid, since the chamber is connected to the inside of the vessel proper by a restricted opening and the element is not exposed to continuous flow past it of oxygen-laden fluid.

Where the supply of energy to the heater for the boiler is an electrical supply line, the stem 16 could be the stem of a normally closed switch in the line, and its release could be made to open the switch and "shut-down" the heater by stopping the supply of electrical energy to it.

Many other obvious modifications could be made in the details and arrangements of parts without departing from the spirit and scope of the present invention, as defined in the appended claims.

What is claimed is:

1. A pressure and temperature protector for a closed fluid vessel having a supply of energy which comprises a normally-off supply control having on and off positions; trigger means for retaining said control in on-position;
   means for sensing the pressure and temperature conditions in said vessel;
   means for tripping said trigger means to release said control to its off position in response to an excessive rise in one of said conditions, said tripping means including a closed casing adapted for mounting on the outside of said vessel in communication with the inside thereof through a restricted passage; said sensing means including a hollow temperature probe extending through said restricted passage into the inside of said vessel; said tripping means further including a rod extending through said hollow probe and fixed at its inner end to said probe by a mass of fusible material having a melting point at a temperature approaching the dangerous temperature against which said vessel is to be protected, the outer end of said rod extending to said trigger means when cocked, and a spring biasing said rod outwardly, whereby upon fusion of said fusible material the freed rod trips said trigger means, said probe having a sleeve extending outwardly with a shoulder flange outside the end of said casing; said rod having a head; said shoulder flange being spring biased against said casing end; a stepped piston reciprocable in said casing, said probe sleeve being threadably adjustable in said piston, said casing end comprising an outer sleeve threadably adjustable in said end, an internal sleeve threadably adjustable in said outer sleeve, and a spring between said internal sleeve and said piston for biasing said shoulder flange against said internal sleeve.

2. A protector as defined in claim 1, a sylphon tube connection between said outer sleeve and said piston, and seal rings between said piston and probe sleeve and between said casing and outer sleeve.

3. A protector as defined in claim 1, further including a flexible sylphon tube piston operative in said casing in response to excessive pressure in said vessel to operate said tripping means to trip said trigger means.

4. A protector as defined in claim 1, wherein said spring for biasing said shoulder flange against said internal sleeve is prestressed, and wherein means are provided for adjusting said spring prestress in accordance with the pressure against which it is desired to protect said vessel.

References Cited in the file of this patent

UNITED STATES PATENTS

| 2,673,707 | McRae | Mar. 30, 1954 |
| 2,871,317 | Sullivan | Jan. 27, 1959 |

FOREIGN PATENTS

| 606,721 | Great Britain | Oct. 11, 1960 |